(12) United States Patent
Takatsuki

(10) Patent No.: US 11,736,638 B2
(45) Date of Patent: Aug. 22, 2023

(54) IMAGE READING APPARATUS, IMAGE PROCESSING METHOD

(71) Applicant: KYOCERA Document Solutions Inc., Osaka (JP)

(72) Inventor: Yasushi Takatsuki, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 17/654,797

(22) Filed: Mar. 14, 2022

(65) Prior Publication Data

US 2022/0303403 A1 Sep. 22, 2022

(30) Foreign Application Priority Data

Mar. 17, 2021 (JP) ................. 2021-044028

(51) Int. Cl.
*H04N 1/04* (2006.01)
*H04N 1/00* (2006.01)
*H04N 1/23* (2006.01)

(52) U.S. Cl.
CPC ......... *H04N 1/0057* (2013.01); *H04N 1/2346* (2013.01)

(58) Field of Classification Search
CPC .................. H04N 1/0057; H04N 1/2346
See application file for complete search history.

(56) References Cited

U.S. PATENT DOCUMENTS

2017/0048410 A1* 2/2017 Noro ............... H04N 1/00748

FOREIGN PATENT DOCUMENTS

JP 2007306411 A 11/2007

* cited by examiner

*Primary Examiner* — Moustapha Diaby
(74) *Attorney, Agent, or Firm* — Alleman Hall Creasman & Tuttle LLP

(57) ABSTRACT

A first image reading portion is disposed in a body portion. A conveying device is disposed in a cover portion. A second image reading portion is disposed in the cover portion. An inclination derivation portion derives two inclination angles of a document sheet respectively corresponding to the first image reading portion and the second image reading portion by performing image processing on two read images obtained by the first image reading portion and the second image reading portion. An information output portion outputs inclination correction information based on the difference between the two inclination angles through an information output device.

5 Claims, 5 Drawing Sheets

IMAGE READING APPARATUS, IMAGE PROCESSING METHOD

INCORPORATION BY REFERENCE

This application is based upon and claims the benefit of priority from the corresponding Japanese Patent Application No. 2021-044028 filed on Mar. 17, 2021, the entire contents of which are incorporated herein by reference.

BACKGROUND

The present disclosure relates to an image reading apparatus and an image processing method facilitating adjustment of inclination of a cover portion relative to a body portion.

An image reading apparatus often includes a document sheet conveying device and an image reading portion that reads images from document sheets conveyed by the document sheet conveying device. Typically, the image reading portion is disposed inside a body portion. In addition, the document sheet conveying device is integrated into a cover portion that can open and close the upper surface of the body portion.

The cover portion may be inclined with respect to its original orientation when attached to the body portion. In this case, read images obtained by the image reading portion inside the body portion are deformed compared with the original images.

Accordingly, it is important to attach the cover portion to the body portion in its original orientation.

For example, it is known that the image reading portion in the body portion performs an image reading process on a part with a specific mark on the cover portion to cause a recognition portion to recognize the difference between the position of the mark detected from the read images and a target position.

SUMMARY

An image reading apparatus according to an aspect of the present disclosure includes a body portion, a first image reading portion, a cover portion, a conveying device, a second image reading portion, an inclination derivation portion, and an information output portion. The first image reading portion is disposed in the body portion and configured to read an image from a document sheet while the document sheet passes through a reading position on an upper surface of the body portion. The cover portion is connected to the body portion and supported to be able to open and close the upper surface of the body. The conveying device is disposed in the cover portion and configured to convey the document sheet along a conveyance path extending via the reading position. The second image reading portion is disposed in the cover portion and configured to read an image from the document sheet while the document sheet is conveyed along the conveyance path. The inclination derivation portion is configured to execute an inclination derivation process of deriving two inclination angles of the document sheet respectively corresponding to the first image reading portion and the second image reading portion by performing image processing on two read images obtained by the first image reading portion and the second image reading portion. The information output portion is configured to output inclination correction information based on a difference between the two inclination angles through an information output device.

An image processing method according to another aspect of the present disclosure is a method of processing read images obtained by an image reading apparatus including the body portion, the first image reading portion, the cover portion, the conveying device, and the second image reading portion. The image processing method includes executing an inclination derivation process of deriving two inclination angles of the document sheet respectively corresponding to the first image reading portion and the second image reading portion by performing image processing on two read images obtained by the first image reading portion and the second image reading portion. The image processing method further includes outputting inclination correction information based on a difference between the two inclination angles through an information output device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Reading Apparatus 1]

An image reading apparatus 1 according to an embodiment is capable of conveying document sheets 9 and reading images on the conveyed document sheets 9.

Figure 1:
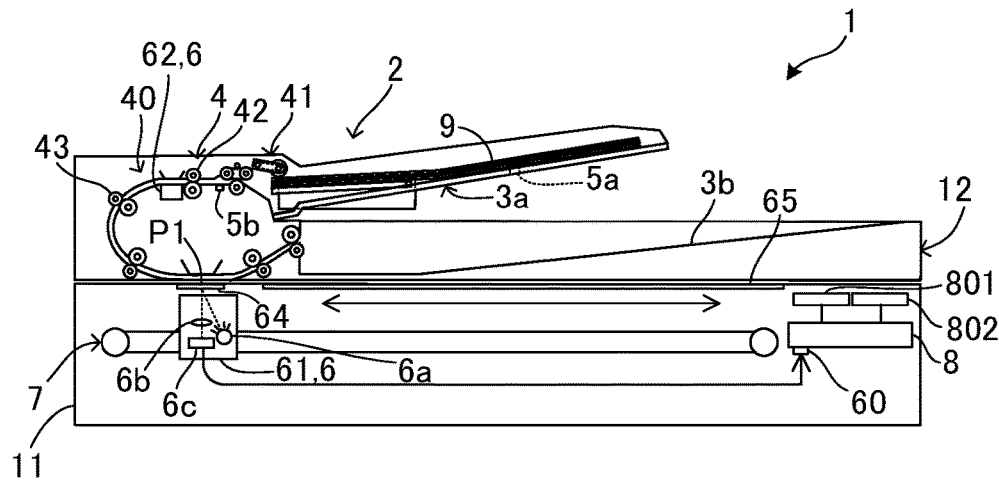
FIG. 1 is a configuration diagram of an image reading apparatus according to an embodiment.

As shown in FIG. 1, the image reading apparatus 1 includes a body portion 11 and a cover portion 12 that covers the upper surface of the body portion 11. The body portion 11 is a housing that houses various types of components.

The cover portion 12 is connected to the body portion 11 and supported to be displaceable between a closed position at which the cover portion 12 covers the upper surface of the body portion 11 and an open position at which the cover portion 12 opens the upper surface of the body portion 11.

That is, the cover portion 12 is supported to be able to open and close the upper surface of the body portion 11.

The image reading apparatus 1 further includes a contact glass 64 and a platen glass 65 disposed on the upper surface of the body portion 11. The contact glass 64 and the platen glass 65 are transparent plate-like members.

The image reading apparatus 1 further includes a document sheet conveying device 2, an image reading portion 6, a moving mechanism 7, a control device 8, an operation device 801, and a display device 802. The document sheet conveying device 2 is integrated into the cover portion 12.

The document sheet conveying device 2 includes a supply tray 3a, a discharge tray 3b, a conveyance path 40, a conveying device 4, a supplied document sheet sensor 5a, and a conveyed document sheet sensor 5b. The supply tray 3a and the discharge tray 3b can hold the document sheets 9.

The conveyance path 40 forms a path along which the document sheets 9 are conveyed inside the cover portion 12. The conveyance path 40 extends from an entrance corresponding to the supply tray 3a to an exit corresponding to the discharge tray 3b via a reading position P1 on the contact glass 64.

The supplied document sheet sensor 5a detects the document sheets 9 placed on the supply tray 3a. For example, the supplied document sheet sensor 5a includes a first displaceable member and a first detection sensor (both not shown).

The first displaceable member is displaced to a lower position below an upper position serving as an initial position upon receiving the load of the document sheets 9 on the supply tray 3a. The first detection sensor detects the first displaceable member displaced to the lower position.

The conveyed document sheet sensor 5b detects the document sheets 9 fed from the supply tray 3a to the conveyance path 40. For example, the conveyed document sheet sensor 5b includes a second displaceable member and a second detection sensor (both not shown).

The second displaceable member is displaced from a reference position to a retracted position by coming into contact with the document sheets 9 fed from the supply tray 3a to the conveyance path 40. The second detection sensor detects the second displaceable member displaced to the retracted position.

The conveying device 4 is disposed inside the cover portion 12. The conveying device 4 feeds the document sheets 9 on the supply tray 3a one by one to the conveyance path 40, conveys the document sheets 9 along the conveyance path 40, and then discharges the document sheets 9 onto the discharge tray 3b.

The conveying device 4 includes a feed mechanism 41 corresponding to the supply tray 3a and pairs of conveying rollers 43 disposed along the conveyance path 40.

The feed mechanism 41 feeds the document sheets 9 on the supply tray 3a one by one to the conveyance path 40. In the present embodiment, the feed mechanism 41 feeds the topmost sheet in the document sheets 9 on the supply tray 3a to the conveyance path 40.

The pairs of conveying rollers 43 are rotationally driven by motors (not shown). This causes the pairs of conveying rollers 43 to convey the document sheets 9 along the conveyance path 40 and to discharge the document sheets 9 from the conveyance path 40 to the discharge tray 3b.

The image reading portion 6 executes an image reading process of reading images formed on the document sheets 9 and outputting data about the read images. The image reading portion 6 can execute the image reading process on the document sheets 9 conveyed along the conveyance path 40. The image reading portion 6 can also execute the image reading process on the document sheets 9 placed on the platen glass 65. In the description below, the images read from the document sheets 9 by the image reading portion 6 are referred to as "read images g1" (see FIGS. 5 to 7).

In the present embodiment, the image reading portion 6 includes a first image reading portion 61, a second image reading portion 62, and an AFE (Analog Front End) 60.

In the description below, the upper surfaces of the document sheets 9 placed on the supply tray 3a are referred to as "first sides", and the lower surfaces of the document sheets 9 placed on the supply tray 3a are referred to as "second sides".

The first image reading portion 61 is disposed inside the body portion 11. The first image reading portion 61 reads images on the first sides of the document sheets 9 passing through the reading position P1 on the conveyance path 40 while being kept at a position facing the reading position P1.

The second image reading portion 62 is disposed inside the cover portion 12. The second image reading portion 62 reads images on the second sides of the document sheets 9 conveyed along the conveyance path 40. The second image reading portion 62 reads the images on the document sheets 9 at a position on the conveyance path 40 upstream of the reading position P1 in a conveying direction along which the document sheets 9 are conveyed.

In the present embodiment, the first image reading portion 61 and the second image reading portion 62 each include a light-emitting portion 6a, a lens 6b, and an image sensor 6c (see FIG. 1). The light-emitting portions 6a, the lenses 6b, and the image sensors 6c extend in a main scanning direction.

The light-emitting portions 6a emit light beams onto the document sheets 9. The lenses 6b guide the light beams reflected from the document sheets 9 to the respective image sensors 6c. The image sensors 6c are line sensors that determine the intensity of the light beams reflected from the document sheets 9 and that output detection signals as signals of the read images g1.

The AFE 60 converts the signals of the read images g1 into digital image data and outputs the image data. The digital image data corresponds to data about the read images g1.

In the example shown in FIG. 1, the first image reading portion 61 and the second image reading portion 62 are CISs (Contact Image Sensors) each including the light-emitting portion 6a, the lens 6b, and the image sensor 6c of the CMOS (Complementary Metal Oxide Semiconductor) type integrated together.

The moving mechanism 7 moves the first image reading portion 61 in a range from the position facing the contact glass 64 to a position facing the platen glass 65.

In a case where the document sheets 9 are conveyed by the conveying device 4, the moving mechanism 7 keeps the first image reading portion 61 at the position facing the contact glass 64.

In a case where the document sheets 9 are placed on the platen glass 65, the moving mechanism 7 moves the first image reading portion 61 along the platen glass 65. Thus, the image sensor 6c of the first image reading portion 61 reads the images on the document sheets 9 while the light-emitting portion 6a of the first image reading portion 61 scans the light beam over the document sheets 9 on the platen glass 65.

That is, when the conveying device 4 operates, the image reading portion 6 executes the image reading process on the document sheets 9 conveyed along the conveyance path 40. In contrast, when the conveying device 4 does not operate, the image reading portion 6 executes the image reading process on the document sheets 9 placed on the platen glass 65.

It is noted that the image sensor 6c of the first image reading portion 61 may be a CCD (Charge Coupled Device) sensor. In this case, the moving mechanism 7 moves the light-emitting portion 6a and the lens 6b while the image sensor 6c of the CCD type is fixed at a predetermined position.

The operation device 801 is configured to receive operations from users and includes, for example, operation buttons and a touch panel. The display device 802 is configured to display information and includes, for example, a panel display device such as a liquid crystal display unit.

Figure 2:
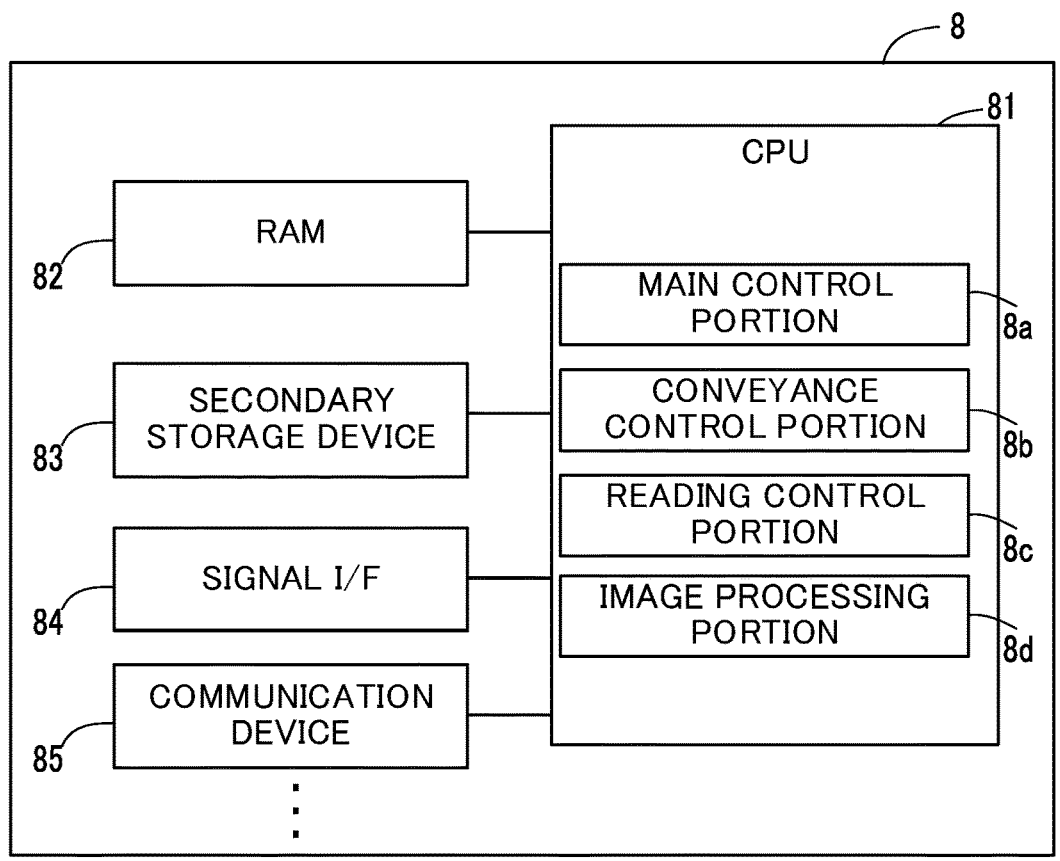
FIG. 2 is a block diagram showing a configuration of a control device in the image reading apparatus according to the embodiment.

The control device 8 executes various types of data processing and controls the image reading apparatus 1. As shown in FIG. 2, the control device 8 includes a CPU (Central Processing Unit) 81, a RAM (Random Access Memory) 82, a secondary storage device 83, and peripherals such as a signal interface 84. The control device 8 further includes a communication device 85 that communicates with other devices.

The secondary storage device 83 is a computer-readable nonvolatile storage device. The secondary storage device 83 can store and update computer programs and various types of data. For example, either a flash memory or a hard disk drive, or both, may be adopted as the secondary storage device 83.

The signal interface 84 converts signals output by various types of sensors into digital data and transmits the converted digital data to the CPU 81. Furthermore, the signal interface 84 converts control commands output by the CPU 81 into control signals and transmits the control signals to components to be controlled.

The CPU 81 is a processor that executes the computer programs to execute various types of data processing and control. The RAM 82 is a computer-readable volatile storage device. The RAM 82 primarily stores the computer programs executed by the CPU 81 and data that is output or consulted by the CPU 81 during execution of various types of processing.

The CPU 81 includes a plurality of processing modules that are implemented when the computer programs are executed. The plurality of processing modules include a main control portion 8a, a conveyance control portion 8b, a reading control portion 8c, and an image processing portion 8d.

The main control portion 8a executes control that causes various types of processing to be started in response to operations on the operation device 801 and executes control of the display device 802. The conveyance control portion 8b controls the conveying device 4 to control the conveyance of the document sheets 9.

The reading control portion 8c controls the image reading portion 6 to cause the image reading portion 6 to execute the image reading process. The image processing portion 8d executes various types of image processing on the read images g1 obtained by the image reading process.

The cover portion 12 may be inclined with respect to its original orientation when attached to the body portion 11. In this case, the read images g1 obtained by the first image reading portion 61 inside the body portion 11 are deformed compared with the original images.

Accordingly, it is important to attach the cover portion 12 to the body portion 11 in its original orientation.

Figure 3:
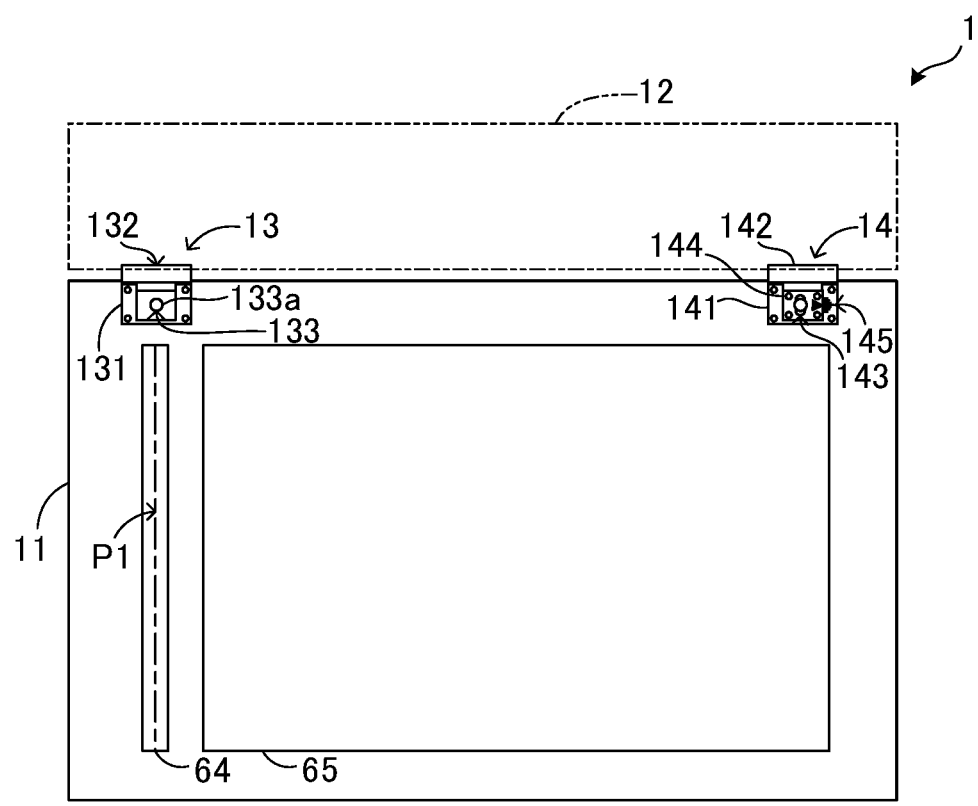
FIG. 3 is a configuration diagram of a cover connecting mechanism in the image reading apparatus according to the embodiment.

As shown in FIG. 3, the cover portion 12 is connected to the body portion 11 by a cover connecting mechanism 13, 14 to be pivotable vertically. The cover connecting mechanism 13, 14 includes a first connecting portion 13 and a second connecting portion 14.

The first connecting portion 13 includes a first base member 131 secured to the body portion 11 and a first hinge member 132 connected to the first base member 131. For example, the first base member 131 is secured to the body portion 11 with screws.

One of a pair of plate portions that constitute the first hinge member 132 is connected to the first base member 131, and the other is connected to the cover portion 12. For example, the first hinge member 132 is connected to the cover portion 12 with screws.

The first connecting portion 13 further includes a rotatable connection mechanism 133. The rotatable connection mechanism 133 connects the first hinge member 132 to the first base member 131 such that the first hinge member 132 is rotatable along the upper surface of the body portion 11. The first hinge member 132 is rotatable around a connecting shaft 133a relative to the first base member 131.

Accordingly, the first connecting portion 13 connects the cover portion 12 to the body portion 11 such that the cover portion 12 is pivotable vertically and rotatable around the connecting shaft 133a along the upper surface of the body portion 11.

For example, the connecting shaft 133a is disposed on the extension of the reading position P1 extending in the longitudinal direction of the contact glass 64.

The second connecting portion 14 includes a second base member 141 secured to the body portion 11 and a second hinge member 142 connected to the second base member 141. For example, the second base member 141 is secured to the body portion 11 with screws.

One of a pair of plate portions that constitute the second hinge member 142 is connected to the second base member 141, and the other is connected to the cover portion 12. For example, the second hinge member 142 is connected to the cover portion 12 with screws.

The second connecting portion 14 further includes a movable connection mechanism 143. The movable connection mechanism 143 connects the second hinge member 142 to the second base member 141 such that the second hinge member 142 is displaceable along an arc.

The second hinge member 142 is displaceable along the arc centered on the connecting shaft 133a. The second hinge member 142 is secured to the second base member 141 with fasteners 144 such as screws.

The angle of the cover portion 12 relative to the body portion 11 is adjusted by loosening the fasteners 144 and adjusting the position of the second hinge member 142 relative to the second base member 141. The angle of the cover portion 12 to be adjusted is an angle about the connecting shaft 133a serving as the center of rotation.

In the present embodiment, the rotatable connection mechanism 133 and the movable connection mechanism 143 are an example of an inclination adjustment mechanism in the cover connecting mechanism 13, 14 that connects the cover portion 12 to the body portion 11.

The second base member 141 has a plurality of graduation marks 145 that indicate the position of the second hinge member 142 relative to the second base member 141. Each of the graduation marks 145 indicates an amount of adjustment in the inclination adjustment mechanism. The graduation marks 145 quantify the amounts of adjustment in the inclination adjustment mechanism.

In a case where an image of a mark made on a part of the cover portion 12 is read by the first image reading portion 61 in the body portion 11, the inclination of the cover portion 12 relative to the body portion 11 can be derived based on the difference between the position of the mark in the read image g1 and a target position.

However, in a case where a calibration member such as a plate with the mark is not attached to the cover portion 12 at a correct position and in a correct orientation, the inclination of the cover portion 12 cannot be derived correctly.

In addition, it is difficult to determine whether the calibration member is attached to the cover portion 12 at the correct position and in the correct orientation.

In the image reading apparatus 1, the CPU 81 executes an adjustment assistance process (described below; see FIG. 4). The adjustment assistance process is a process for facilitating the adjustment of inclination of the cover portion 12 relative to the body portion 11 in the case where the cover portion 12 is attached to the body portion 11.

The main control portion 8a starts the adjustment assistance process upon detecting a predetermined adjustment start operation on the operation device 801.

[Adjustment Assistance Process]

Figure 4:
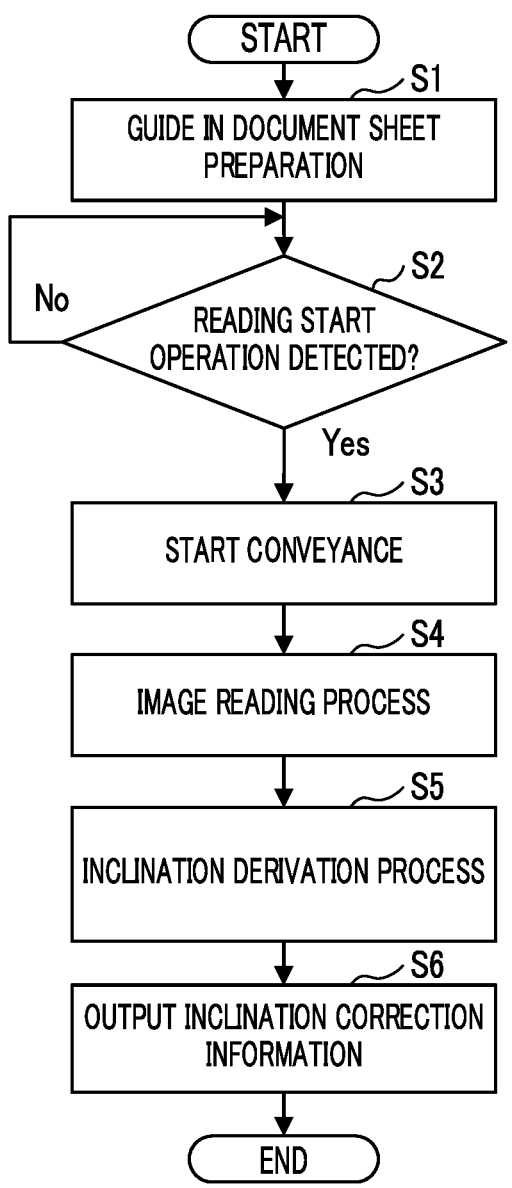
FIG. 4 is a flowchart showing an example of a procedure of an adjustment assistance process in the image reading apparatus according to the embodiment.

The following describes an example of a procedure of the adjustment assistance process with reference to a flowchart shown in FIG. 4. The adjustment assistance process is an embodiment of an image processing method of processing the read images g1 obtained by the image reading apparatus 1.

In the following description, S1, S2, . . . are identification signs representing a plurality of steps in the adjustment assistance process. In the adjustment assistance process, a process in step S1 is executed first.

<Step S1>

In step S1, the main control portion 8a executes a document sheet preparation guide process of causing the display device 802 to display predetermined guide information. Subsequently, the main control portion 8a moves the process to step S2.

The guide information provides guidance on placing a predetermined document sheet 9 on the supply tray 3a. For example, the guide information provides guidance on placing a document sheet 9 of a predetermined size on the supply tray 3a.

Figure 7:
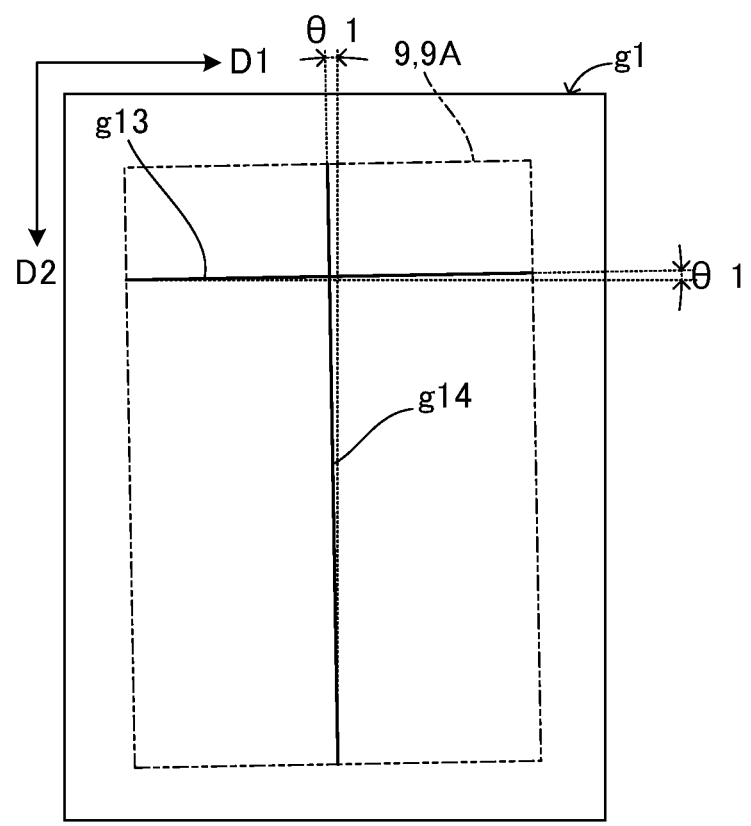
FIG. 7 shows an example of line images on a calibration document sheet detected from a read image.

In addition, the guide information may provide guidance on placing a predetermined calibration document sheet 9A on the supply tray 3a (see FIG. 7). The calibration document sheet 9A is a document sheet 9 having predetermined line images formed on both sides.

For example, the calibration document sheet 9A has either a horizontal line image g13 extending in the horizontal direction of the calibration document sheet 9A or a vertical line image g14 extending in the vertical direction of the calibration document sheet 9A on each side.

<Step S2>

In step S2, the main control portion 8a moves the process to step S3 upon detecting a reading start operation on the operation device 801 while the document sheet 9 on the supply tray 3a is detected by the supplied document sheet sensor 5a.

The main control portion 8a waits until the main control portion 8a detects the reading start operation while the document sheet 9 on the supply tray 3a is detected by the supplied document sheet sensor 5a.

<Step S3>

In step S3, the conveyance control portion 8b causes the conveying device 4 to start conveying the document sheet 9 and then moves the process to step S4.

<Step S4>

In step S4, the reading control portion 8c causes the image reading portion 6 to execute the image reading process. Subsequently, the reading control portion 8c moves the process to step S5.

The process in step S4 causes the second image reading portion 62 to execute the image reading process on the second side of the document sheet 9 and causes the first image reading portion 61 to execute the image reading process on the first side of the document sheet 9. This results in two read images g1 corresponding to both sides of the document sheet 9.

<Step S5>

In step S5, the image processing portion 8d executes an inclination derivation process. Subsequently, the image processing portion 8d moves the process to step S6. The image processing portion 8d that executes the process in step S5 is an example of an inclination derivation portion.

Figure 5:
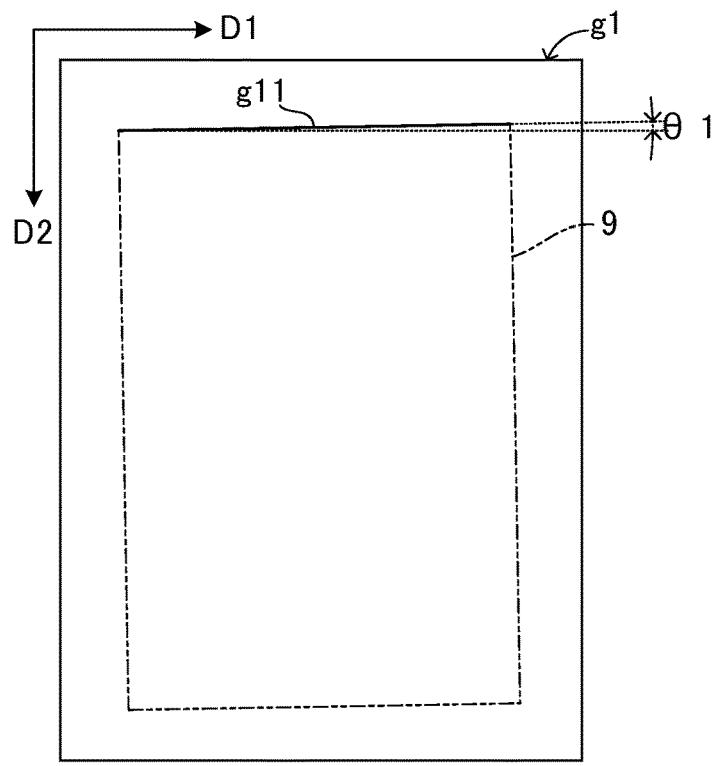
FIG. 5 shows an example of an upper edge portion of a document sheet detected from a read image.
Figure 6:
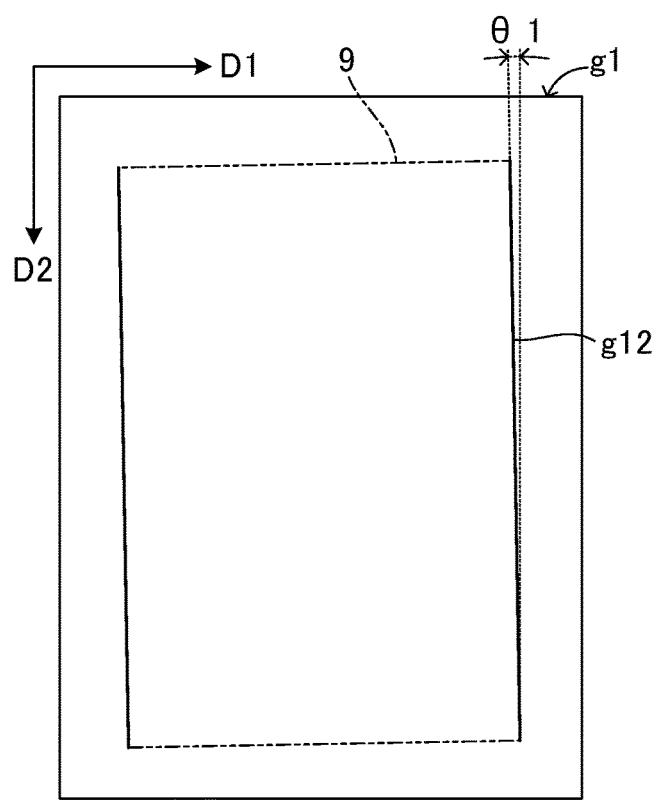
FIG. 6 shows an example of a side edge portion of a document sheet detected from a read image.

The inclination derivation process is a process of deriving two inclination angles 81 of the document sheet respectively corresponding to the first image reading portion 61 and the second image reading portion 62 by performing image processing on the two read images g1 obtained in step S4 (see FIGS. 5 and 6).

For example, in step S5, the image processing portion 8d detects an edge portion such as an upper edge portion g11 or a side edge portion g12 of the rectangular document sheet 9 from the read images g1 (see FIGS. 5 and 6).

Specifically, the image processing portion 8d executes a known edge detection process on the read images g1 in a vertical direction D2 to detect the upper edge portion g11 of the document sheet 9. In addition, the image processing portion 8d executes the edge detection process on the read images g1 in a horizontal direction D1 to detect the side edge portion g12 of the document sheet 9.

Furthermore, the image processing portion 8d derives the tilt angles of the edge portion relative to a predetermined reference direction as the inclination angles 81 of the document sheet (see FIGS. 5 and 6).

In addition, in a case where the read images g1 are those read from the calibration document sheet 9A, the image processing portion 8d can detect the horizontal line images g13 or the vertical line images g14 by the edge detection process.

In addition, in a case where the horizontal line images g13 or the vertical line images g14 are images of a predetermined chromatic color such as red, green, or blue, the image processing portion 8d can detect the horizontal line images g13 or the vertical line images g14 by detecting images of a specific color from the read images g1 (see FIG. 7).

In addition, the image processing portion 8d can derive the tilt angles of the horizontal line images g13 or the vertical line images g14 relative to the predetermined reference direction as the inclination angles 81 of the document sheet (see FIG. 7).

Usually, the orientation of the document sheet 9 does not substantially change while the document sheet 9 is conveyed from the position of the second image reading portion 62 to the reading position P1.

Accordingly, the difference between the two inclination angles 81 derived in step S5 represents the angle formed between the longitudinal direction of the first image reading portion 61 and the longitudinal direction of the second image reading portion 62. In addition, the angle formed between the longitudinal direction of the first image reading portion 61 and the longitudinal direction of the second image reading portion 62 represents the inclination of the cover portion 12 relative to the body portion 11.

For convenience, FIGS. 5 to 7 show examples of the inclination angles 81 that are not 0°. However, when the inclination of the cover portion 12 is adjusted, at least the inclination angle 81 corresponding to the read image g1 obtained by the second image reading portion 62 is substantially 0° in most cases.

The image processing portion 8d may move the process to step S1 in a case where the inclination angle 81 derived from the read image g1 obtained by the second image reading portion 62 is outside a predetermined allowable range. Thus, the processes in steps S1 to S4 are repeated until the document sheet 9 is conveyed in the correct orientation without slanting.

In addition, in a case where the processes in steps S1 to S4 are repeated a predetermined number of times, the main control portion 8a may cause the display device 802 to display in-cover adjustment information. The in-cover adjustment information prompts an adjuster to adjust the installation states of the document sheet conveying device 2 and the second image reading portion 62 in the cover portion 12.

<Step S6>

In step S6, the main control portion 8a outputs inclination correction information based on the difference between the two inclination angles 81 derived in step S5 through the display device 802. Subsequently, the main control portion 8a ends the adjustment assistance process.

The main control portion 8a that executes the process in step S6 is an example of an information output portion. In addition, the display device 802 is an example of an information output device. It is noted that the main control portion 8a may output the inclination correction information in the form of voice through a sound output device (not shown). The sound output device is another example of the information output device.

For example, the inclination correction information includes information about an amount of adjustment, indicated by the graduation marks 145, in the movable connection mechanism 143 converted from the difference between the two inclination angles 81. The amount of adjustment indicated by the graduation marks 145 is an example of an amount of adjustment in the inclination adjustment mechanism.

According to the present embodiment, the inclination of the cover portion 12 relative to the body portion 11 can be easily adjusted. In addition, the calibration member with the mark to be read by the first image reading portion 61 does not need to be attached to the cover portion 12.

APPLICATION EXAMPLE

The processes in steps S5 and S6 in the adjustment assistance process shown in FIG. 4 may be executed by a processor of an information processing apparatus that can communicate with the image reading apparatus 1. In this case, the CPU 81 transmits data about the two read images g1 obtained in step S4 to the information processing apparatus through the communication device 85.

The processor of the information processing apparatus receives the data about the two read images g1 from the image reading apparatus 1 and executes the processes in steps S5 and S6. The present application example produces effects similar to those produced by the embodiment described above.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading apparatus comprising:
   a body portion;
   a first image reading portion disposed in the body portion and configured to read an image from a document sheet while the document sheet passes through a reading position on an upper surface of the body portion;
   a cover portion connected to the body portion and supported to be able to open and close the upper surface of the body portion;
   a conveying device disposed in the cover portion and configured to convey the document sheet along a conveyance path extending via the reading position;
   a second image reading portion disposed in the cover portion and configured to read an image from the document sheet while the document sheet is conveyed along the conveyance path;
   an inclination derivation portion configured to execute an inclination derivation process of deriving two inclination angles of the document sheet respectively corresponding to the first image reading portion and the second image reading portion by performing image processing on two read images obtained by the first image reading portion and the second image reading portion; and
   an information output portion configured to output inclination correction information based on a difference between the two inclination angles through an information output device, wherein
   the cover portion is connected to the body portion by a cover connecting mechanism, and
   the inclination correction information includes information about an amount of adjustment to an inclination adjustment mechanism in the cover connecting mechanism converted from the difference between the two inclination angles.

2. The image reading apparatus according to claim 1, wherein
   the inclination derivation process includes:
      detecting an edge portion of the document sheet having a rectangular shape from each of the read images; and
      deriving tilt angles of the edge portion relative to a predetermined reference direction as the inclination angles of the document sheet.

3. An image reading apparatus comprising:
   a body portion;
   a first image reading portion disposed in the body portion and configured to read an image from a document sheet while the document sheet passes through a reading position on an upper surface of the body portion;
   a cover portion connected to the body portion and supported to be able to open and close the upper surface of the body portion;
   a conveying device disposed in the cover portion and configured to convey the document sheet along a conveyance path extending via the reading position;
   a second image reading portion disposed in the cover portion and configured to read an image from the document sheet while the document sheet is conveyed along the conveyance path;
   an inclination derivation portion configured to execute an inclination derivation process of deriving two inclination angles of the document sheet respectively corresponding to the first image reading portion and the second image reading portion by performing image processing on two read images obtained by the first image reading portion and the second image reading portion; and an information output portion configured to output inclination correction information based on a difference between the two inclination angles through an information output device, wherein the inclination derivation process includes:
   detecting a line image set in advance and included in each of the read images; and
   deriving tilt angles of the line images relative to a predetermined reference direction as the inclination angles of the document sheet.

4. An image processing method of processing read images obtained by an image reading apparatus, the image reading apparatus comprising:
   a body portion;
   a first image reading portion disposed in the body portion and configured to read an image from a document sheet while the document sheet passes through a reading position on an upper surface of the body portion;
   a cover portion connected to the body portion and supported to be able to open and close the upper surface of the body portion;
   a conveying device disposed in the cover portion and configured to convey the document sheet along a conveyance path extending via the reading position; and
   a second image reading portion disposed in the cover portion and configured to read an image from the document sheet while the document sheet is conveyed along the conveyance path, the image processing method comprising:
   executing an inclination derivation process of deriving two inclination angles of the document sheet respectively corresponding to the first image reading portion and the second image reading portion by performing image processing on two read images obtained by the first image reading portion and the second image reading portion; and
   outputting inclination correction information based on a difference between the two inclination angles through an information output device, wherein the cover portion is connected to the body portion by a cover connecting mechanism, and the inclination correction information includes information about an amount of adjustment to an inclination adjustment mechanism in the cover connecting mechanism converted from the difference between the two inclination angles.

5. An image processing method of processing read images obtained by an image reading apparatus, the image reading apparatus comprising:
   a body portion;
   a first image reading portion disposed in the body portion and configured to read an image from a document sheet while the document sheet passes through a reading position on an upper surface of the body portion;
   a cover portion connected to the body portion and supported to be able to open and close the upper surface of the body portion;
   a conveying device disposed in the cover portion and configured to convey the document sheet along a conveyance path extending via the reading position; and
   a second image reading portion disposed in the cover portion and configured to read an image from the document sheet while the document sheet is conveyed along the conveyance path, the image processing method comprising:
   executing an inclination derivation process of deriving two inclination angles of the document sheet respectively corresponding to the first image reading portion and the second image reading portion by performing image processing on two read images obtained by the first image reading portion and the second image reading portion; and
   outputting inclination correction information based on a difference between the two inclination angles through an information output device, wherein the inclination derivation process includes:
   detecting a line image set in advance and included in each of the read images; and
   deriving tilt angles of the line images relative to a predetermined reference direction as the inclination angles of the document sheet.

* * * * *